United States Patent
Yoneda

(10) Patent No.: US 6,992,613 B2
(45) Date of Patent: Jan. 31, 2006

(54) OBJECT DETECTING DEVICE

(75) Inventor: Kimihisa Yoneda, Kobe (JP)

(73) Assignee: Fujitsu Ten Limited, Hyogo (JP)

(*) Notice: Subject to any disclaimer, the term of this patent is extended or adjusted under 35 U.S.C. 154(b) by 0 days.

(21) Appl. No.: 10/930,903

(22) Filed: Sep. 1, 2004

(65) Prior Publication Data

US 2005/0046606 A1    Mar. 3, 2005

(30) Foreign Application Priority Data

Sep. 2, 2003    (JP)    ............................ 2003-309751

(51) Int. Cl.
G01S 13/04    (2006.01)
G01S 13/08    (2006.01)
G01S 13/93    (2006.01)

(52) U.S. Cl. ........................... 342/59; 342/27; 342/28; 342/70; 342/118; 342/175; 342/195; 701/300; 701/301

(58) Field of Classification Search ................. 342/27, 342/28, 59, 70–72, 82–103, 118, 128–147, 342/158, 175, 189–197, 450–465, 442; 340/928; 701/300, 301; 180/167–169
See application file for complete search history.

(56) References Cited

U.S. PATENT DOCUMENTS

| | | | |
|---|---|---|---|
| 5,381,156 A * | 1/1995 | Bock et al. | .................... 342/59 |
| 5,790,052 A * | 8/1998 | Grabow | ....................... 340/928 |
| 6,055,042 A * | 4/2000 | Sarangapani | ................ 180/167 |
| 6,628,227 B1 * | 9/2003 | Rao et al. | ...................... 342/70 |

FOREIGN PATENT DOCUMENTS

| | | |
|---|---|---|
| JP | 6-148329 | 5/1994 |
| JP | 2002-372577 | 12/2002 |

* cited by examiner

*Primary Examiner*—Bernarr E. Gregory
(74) *Attorney, Agent, or Firm*—Wenderoth, Lind & Ponack, L.L.P.

(57) ABSTRACT

An object detecting device is provided whereby the number and size of detected objects can be determined without making the construction of the device more complex and the cost of components higher. The object detecting device includes multiple transmitter-receivers for transmitting radio waves and receiving reflected waves, each of the transmitter-receivers receiving both a reflected wave of a radio wave transmitted by itself and reflected waves of radio waves transmitted by other transmitter-receivers, a path-by-path reception distance computing unit for computing the path-by-path reception distance of every reflected wave and an object determination element for determining the number and/or size of detected objects based on the relationship between the reception distances computed by the path-by-path reception distance computing unit.

8 Claims, 11 Drawing Sheets

OBJECT DETECTING DEVICE

BACKGROUND OF THE INVENTION

1. Field of the Invention

The present invention relates to an object detecting device and, more particularly, to an object detecting device whereby the number and size of detected objects can be determined.

2. Description of the Relevant Art

In recent years, systems for vehicles to which a radar technique is applied have been enthusiastically developed. For example, a driver support system wherein the distance between one's vehicle and the vehicle ahead and the like are measured using a radar so that a safe distance therebetween is kept based on those measurements, and a preventive safety system for avoiding a collision and the like by detecting the presence of a pedestrian or the like in advance using a radar, have been known.

FIGS. 8(a) and 8(b) are illustrations showing an object detecting operation by a conventional radar, wherein FIGS. 8(a) and 8(b) show the radio wave reception status in the case of multiple small objects being present ahead of a vehicle and that in the case of a large object being present ahead thereof, respectively.

Reference numeral 1 in the figure represents a radar, being installed forward of a vehicle M, which measures the distance between the vehicle M and an object present ahead thereof and the like. The radar 1 comprises a transmitter-receiver 2 for transmitting an electromagnetic pulse through an antenna (not shown) arranged in such a manner as to point in the forward direction of the vehicle M and receiving through the antenna a reflected pulse of the electromagnetic pulse so as to detect the time (so-called delay time) between transmission of the electromagnetic pulse and reception of the reflected pulse, and a processing element 3 for computing the distance to an object and the like based on the delay time detected by the transmitter-receiver 2. Using the radar 1, the distance to the nearest object to the vehicle M (or the shortest distance) is obtained based on the delay time.

However, when there are multiple small objects (A and B) ahead of the vehicle M as shown in FIG. 8(a), only the distance from the vehicle M to the object A closest thereto is detected by the radar 1. As a result, even if another object B is present still ahead in the periphery of the object A, the presence of the object B cannot be detected. In addition, the size of the object A cannot be determined.

When there is a large object C present ahead of the vehicle M as shown in FIG. 8(b), the shortest distance between the vehicle M and the object C is detected using the radar 1, but the size of the object C cannot be determined.

FIGS. 9(a) and 9(b) are illustrations showing the object detecting operation by a conventional dual-type radar. And FIGS. 9(a) and 9(b) are illustrations showing the radio wave reception status in the case of multiple small objects being present ahead of a vehicle and that in the case of a large object being present ahead thereof, respectively.

A radar 1A comprises transmitter-receivers 2A and 2B each for receiving a reflected pulse of an electromagnetic pulse transmitted by itself so as to detect the time (delay time) elapsed before receiving the reflected pulse, and a processing element 3A for computing the distance to an object and the like based on each delay time detected by the transmitter-receivers 2A and 2B, being installed forward of a vehicle M. Using the radar 1A, the distances from each of the transmitter-receivers 2A and 2B to the nearest object to the vehicle M are obtained based on the delay times detected by the transmitter-receivers 2A and 2B (the times each elapsed before receiving the reflected pulse of the electromagnetic pulse transmitted by itself), respectively, and the direction in which the detected object is present is obtained (here, in cases where the same object is detected by the transmitter-receivers 2A and 2B).

When there are small objects A and B present ahead of the vehicle M as shown in FIG. 9(a), the object A is detected by the transmitter-receiver 2A while the object B is detected by the transmitter-receiver 2B in the radar 1A, so that the shortest distance between the transmitter-receiver 2A and the object A and that between the transmitter-receiver 2B and the object B are detected, respectively. However, the radar 1A erroneously detects only one object being present at the point of intersection of an arc A1 with the distance from the transmitter-receiver 2A to the object A as radius and an arc B1 with the distance from the transmitter-receiver 2B to the object B as radius.

When there is a large object C ahead of the vehicle M as shown in FIG. 9(b), the shortest distance between the transmitter-receiver 2A and the object C and that between the transmitter-receiver 2B and the object C are detected, respectively, in the radar 1A. The radar 1A erroneously detects only one object being present at the point of intersection of an arc C1 with the shortest distance from the transmitter-receiver 2A to the object C as radius and an arc C2 with the shortest distance from the transmitter-receiver 2B to the object C as radius, so that the radar 1A erroneously judges the object C as being present nearer than it really is. In addition, the size of the object C cannot be determined.

When the direction of radio waves transmitted from a transmitter-receiver is thus fixed, the number and size of detected objects can be determined neither in the case of a single transmitter-receiver nor in the case of dual transmitter-receivers.

On the other hand, Japanese Kokai No.1994-148329 teaches that by transmitting radio waves in a laterally sweeping manner and receiving a reflected wave at every sweep angle so as to detect angle and distance data of an object to a vehicle, the size of a detected object can be obtained from the angle and distance data. It is possible to detect the direction in which an object is present, the size and number thereof and the like by thus sweepingly transmitting radio waves. However, in such device, a unit for sweepingly transmitting radio waves is additionally required. Furthermore, the size of an antenna becomes larger in order to increase its directivity and the construction of the device becomes more complex, resulting in a higher cost of components.

SUMMARY OF THE INVENTION

The present invention was accomplished in order to solve the above problem, and it is an object of the present invention to provide an object detecting device whereby the number and size of detected objects can be determined without making the construction of the device more complex and the cost of components higher.

The transmitter-receivers 2A and 2B each of the above-described conventional radar 1A receive only a reflected wave of a radio wave transmitted by itself, and based on the delay times of these reflected waves, the distances between an object present ahead of the vehicle M and each of the transmitter-receivers 2A and 2B are obtained. The present inventor noted that when a radio wave is transmitted from one transmitter-receiver, the receiving function of the other transmitter-receiver is not utilized at all in the conventional radar 1A, and found that the number and size of detected objects can be determined by receiving a reflected wave of a radio wave transmitted by itself and reflected waves of radio waves transmitted by other transmitting elements so as to find the path-by-path reception distance of every reflected wave and analyze the relationship between the reception distances when multiple transmitter-receivers are mounted, resulting in the completion of the present invention.

An object detecting device according to the first aspect of the present invention is characterized by being an object detecting device comprising multiple transmitter-receivers for transmitting radio waves and receiving reflected waves, each of these transmitter-receivers receiving both a reflected wave of a radio wave transmitted by itself and reflected waves of radio waves transmitted by other transmitter-receivers, which comprises a path-by-path reception distance computing unit for computing the path-by-path reception distance of every reflected wave and an object determination element for determining the number and/or size of detected objects based on the relationship between the reception distances computed by the path-by-path reception distance computing unit.

Using the object detecting device according to the first aspect of the present invention, each transmitter-receiver receives both the reflected wave of the radio wave transmitted by itself and the reflected waves of the radio waves transmitted by the other transmitter-receivers, the path-by-path reception distance of every reflected wave is computed, and based on the relationship between the computed reception distances, the number and/or size of the detected objects can be determined. Therefore, based on the determined number and/or size of the detected objects, it is possible to conduct control for avoiding a collision with the detected object before it happens, control for protecting occupants and the like in a collision and the like with attention to every detail, and it becomes possible to conduct appropriate control according to the number and size of the detected objects. Moreover, since a mechanism for sweepingly transmitting radio waves or the like is not required, the construction of the device is not made more complex and the cost of components can be held down.

An object detecting device according to the second aspect of the present invention is characterized by the object determination element which determines that the detected object is single and small when points of intersection of each arc with each transmitter-receiver as the center and the distance to the detected object as the radius and each elliptic curve passing through each detected object with two transmitter-receivers as the center can be approximated roughly to one point in the object detecting device according to the first aspect of the present invention.

Using the object detecting device according to the second aspect of the present invention, since it is determined that the detected object is single and small when the points of intersection of said each arc and said each elliptic curve can be approximated roughly to one point, it is possible to precisely determine the case where there is one small object.

An object detecting device according to the third aspect of the present invention is characterized by the object determination element which determines that the detected object is more than one and small when points of intersection of each arc with each transmitter-receiver as the center and the distance to the detected object as the radius and each elliptic curve passing through each detected object with two transmitter-receivers as the center cannot be approximated roughly to one point, and said each elliptic curve is not the same in the object detecting device according to the first or second aspect of the present invention.

Using the object detecting device according to the third aspect of the present invention, since it is determined that the detected object is more than one and small when the points of intersection of said each arc and said each elliptic curve cannot be approximated roughly to one point (or multiple points of intersection are formed apart) and said each elliptic curve is not the same, it is possible to almost precisely determine the case where there are multiple small objects.

An object detecting device according to the fourth aspect of the present invention is characterized by the object determination element which determines that the detected object is single and large when points of intersection of each arc with each transmitter-receiver as the center and the distance to the detected object as the radius and each elliptic curve passing through each detected object with two transmitter-receivers as the center cannot be approximated roughly to one points and said each elliptic curve is the same in any of the object detecting devices according to the first through third aspects of the present invention.

Using the object detecting device according to the fourth aspect of the present invention, since it is determined that the detected object is single and large when the points of intersection of said each arc and said each elliptic curve cannot be approximated roughly to one point (or multiple points of intersection are formed apart) and said each elliptic curve is the same, it is possible to almost precisely determine the case where there is a single large object.

An object detecting device according to the fifth aspect of the present invention is characterized by comprising a type determination element for determining the type of the detected object based on the time-varying characteristic of reception strength of said every reflected wave in any of the object detecting devices according to the first through fourth aspects of the present invention. Using the object detecting device according to the fifth aspect of the present invention, it is possible to determine the type of the detected object by the type determination element, so that it becomes possible to conduct control in consideration of the type of the detected object.

An object detecting device according to the sixth aspect of the present invention is characterized by the type determination element which determines the type of the detected object when it is determined that the detected object is small by the object determination element in the object detecting device according to the fifth aspect of the present invention.

When it is determined that the detected object is small, there are some cases where a human or the like is included. In those cases, the need for appropriate control according to the type of the detected object becomes higher than when it is determined that the detected object is large. Using the object detecting device according to the sixth aspect of the present invention, since the type of the detected object is determined in cases where it is determined that the detected object is small, type determination can be appropriately conducted when the necessity for the type determination is high, resulting in effective determination processing.

An object detecting device according to the seventh aspect of the present invention is characterized by the type determination element which determines that a human is included in the detected object when the reception strength of said every reflected wave unstably changes with time in the object detecting device according to the sixth aspect of the present invention.

Using the object detecting device according to the seventh aspect of the present invention, it is possible to determine whether the detected object is a human or an object other than a human with appreciable probability by utilizing that the change with time of the reception strength of a reflected wave from a human is an unstable change with some regularity (an occurrence of fading) such as a Rayleigh distribution or a rice distribution, while the change with time of the reception strength of a reflected wave from an obstacle such as a vehicle is a stable change. When it is determined that the detected object is a human, it becomes possible to appropriately conduct control for protecting the man.

An object detecting device according to the eighth aspect of the present invention is characterized by the object determination element which determines that the detected object is more than one and that these detected objects each are present in areas to be detected by only one of the transmitter-receivers when the reception distance of a reflected wave received by each transmitter-receiver of a radio wave transmitted by itself is computed and the reception distances of reflected waves of radio waves transmitted by other transmitter-receivers are not computed in the object detecting device according to the first aspect of the present invention.

Using the object detecting device according to the eighth aspect of the present invention, it is possible to appropriately determine the case where the detected object is more than one and these detected objects each are present in the areas to be detected by only one of the transmitter-receivers, in other word, the case where they are present in the areas where the transmission-reception areas of radio waves of each transmitter-receiver do not overlap one another (for example, although there are multiple objects present ahead of a vehicle, each object is present in a side position where there is a low risk of a collision even if the vehicle moves straight forward), so that it is possible to judge a direction and the like for avoiding a collision with the detected object.

BRIEF DESCRIPTION OF THE DRAWINGS

FIGS. 8(a) and 8(b) are illustrations showing a method of object detection using a conventional radar, wherein FIGS. 8(a) and 8(b) are illustrations in the case of multiple small objects being present and in the case of a large object being present, respectively; and FIGS. 9(a) and 9(b) are illustrations showing a method of object detection using another conventional radar, wherein FIGS. 9(a) and 9(b) are illustrations in the case of multiple small objects being present and in the case of a large object being present, respectively.

DESCRIPTION OF THE PREFERRED EMBODIMENTS

Figure 1:
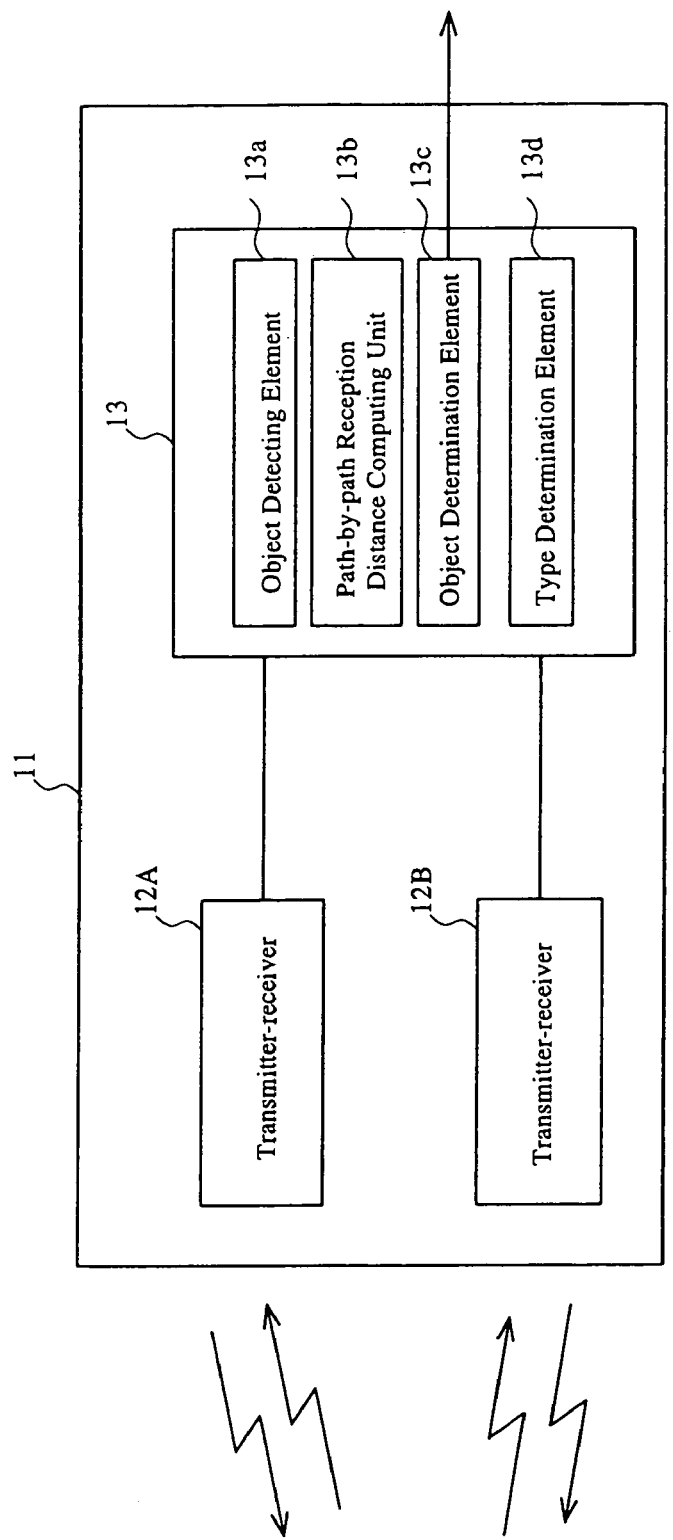
FIG. 1 is a block diagram schematically showing the principal part of an object detecting device according to an embodiment of the present invention.

The preferred embodiment of the object detecting device according to the present invention is described below by reference to the drawings. FIG. 1 is a block diagram schematically showing the principal part of an object detecting device according to an embodiment of the present invention.

Reference numeral 11 in the figure represents an object detecting device, being installed forward of a vehicle, for detecting an object present ahead of the vehicle, comprising transmitter-receivers 12A and 12B, and a processing element 13.

Each of the transmitter-receivers 12A and 12B generates to transmit an electromagnetic pulse through an antenna (not shown) by turns with prescribed timing, and receives both a reflected pulse of an electromagnetic wave transmitted by itself and a reflected pulse of an electromagnetic wave transmitted by the other transmitter-receiver through the antenna so as to be able to detect the reception strength of every reflected pulse. By each of the transmitter-receivers 12A and 12B, the timing at which an electromagnetic pulse is transmitted can be grasped, so that the time between transmission of an electromagnetic pulse and reception of its reflected pulse (so-called delay time) can be detected thereby.

The processing element 13, being connected to the transmitter-receivers 12A and 12B, can obtain data of the reception strength of every reflected pulse detected by each of the transmitter-receivers 12A and 12B, and can obtain data of the delay time of the reflected pulse of the electromagnetic pulse transmitted by itself and data of the delay time of the reflected pulse of the electromagnetic pulse transmitted by the other transmitter-receiver from both the transmitter-receivers 12A and 12B. The processing element 13 comprises an object detecting element 13a, a path-by-path reception distance computing unit 13b, an object determination element 13c and a type determination element 13d.

The object detecting element 13a detects an object by judging whether the acquired reception strength is not less than a prescribed level based on the data of the reception strength of every reflected pulse obtained from each of the transmitter-receivers 12A and 12B.

The path-by-path reception distance computing unit 13b finds the reception distance of the reflected pulse of the electromagnetic pulse transmitted by itself and the reception distance of the reflected pulse of the electromagnetic pulse transmitted by the other transmitter-receiver based on the data of the delay time obtained from each of the transmitter-receivers 12A and 12B.

The object determination element 13c determines the number and/or size of detected objects based on the relationship between the reception distances computed by the path-by-path reception distance computing unit 13b. The type determination element 13d determines whether a human is included in the detected object by analyzing the reception characteristic of every reflected pulse (or the time-varying characteristic of reception strength of every reflected pulse) acquired from each of the transmitter-receivers 12A and 12B and judging whether the change with time of the reception strength of said every received reflected pulse is unstable. That is, the determination of whether a human is included in the detected object is made by utilizing that the change with time of the reception strength of a reflected wave from a human is an unstable change having some regularity (an occurrence of fading) such as a Rayleigh distribution or a rice distribution.

Figure 2:
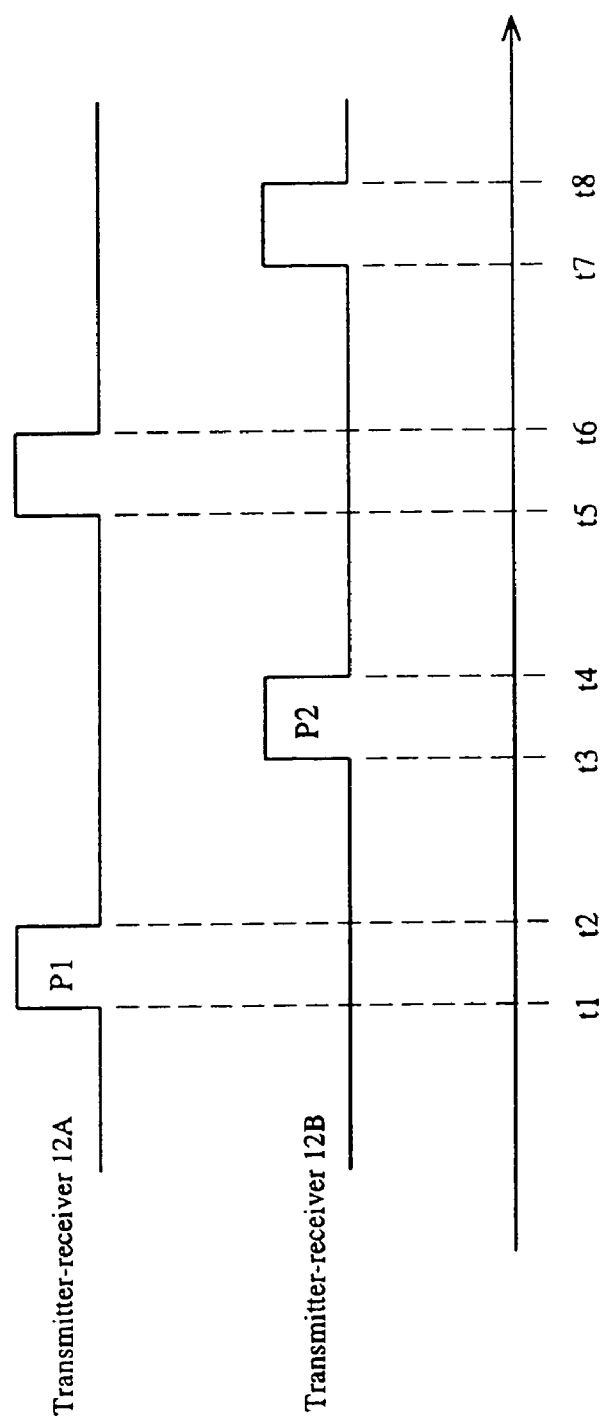
FIG. 2 is a timing chart for explaining the transmission operation of an electromagnetic pulse performed by transmitter-receivers of the object detecting device according to the embodiment.

FIG. 2 is a timing chart for explaining the transmission operation of an electromagnetic pulse performed by the transmitter-receivers 12A and 12B of the object detecting device 11 according to the embodiment.

First, an electromagnetic pulse P1 is transmitted from the transmitter-receiver 12A between times t1 and t2. The transmitter-receiver 12A receives a reflected pulse relative to the electromagnetic pulse P1 between times t2 and t3, and the transmitter-receiver 12B also receives a reflected pulse relative to the electromagnetic pulse P1.

An electromagnetic pulse P2 is transmitted from the other transmitter-receiver 12B between times t3 and t4. The transmitter-receiver 12B receives a reflected pulse relative to the electromagnetic pulse P2 between times t4 and t5, and the transmitter-receiver 12A also receives a reflected pulse relative to the electromagnetic pulse P2. Thereafter, electromagnetic pulses are transmitted by turns with the same timing.

Here, the reception time (t2–t3, t4–t5 and the like) of an electromagnetic pulse by the transmitter-receivers 12A and 12B is set to be an appropriate value in consideration of the time required for an electromagnetic pulse to travel the longest distance previously selected as an object detection range and return.

Figure 3:
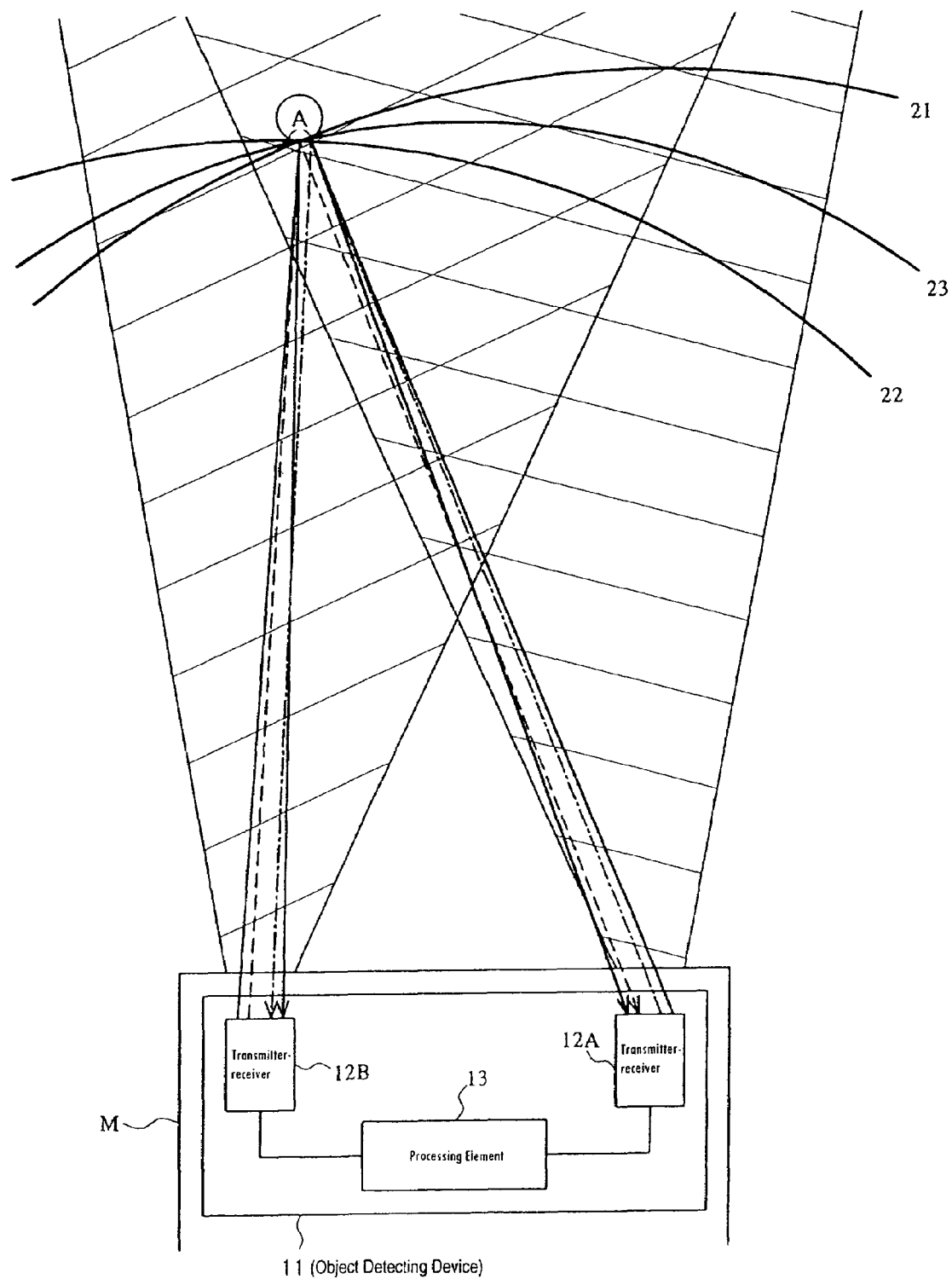
FIG. 3 is an illustration showing a method of object determination in the case of a single small object being present ahead of a vehicle.

The determination processing operation of a detected object in the object detecting device 11 according to the embodiment is described below. FIG. 3 is an illustration showing a method of object determination in the case of a small object A being present ahead of a vehicle M. Here, in FIG. 3, transmission-reception areas of radio waves of each of the transmitter-receivers 12A and 12B are diagonally shaded. The crossing area of oblique lines is an area where an object can be detected by both of them. The transmission-reception areas of radio waves of each of the transmitter-receivers 12A and 12B are set as needed according to how distant objects are detected or how to control after detecting an object.

When an electromagnetic pulse is transmitted from the transmitter-receiver 12A, the electromagnetic pulse strikes the object A and is reflected. The transmitter-receiver 12A receives an electromagnetic wave which returned through a path shown by a heavy solid line as a reflected pulse, while the transmitter-receiver 12B receives an electromagnetic wave which was reflected in the direction of the transmitter-receiver 12B through a path shown by a dash-dot line as a reflected pulse.

When an electromagnetic pulse is transmitted from the other transmitter-receiver 12B after an elapse of a prescribed reception time, the electromagnetic pulse strikes the object A and is reflected. The transmitter-receiver 12B receives an electromagnetic wave which returned through a path shown by a solid line as a reflected pulse, while the transmitter-receiver 12A receives an electromagnetic wave which was reflected in the direction of the transmitter-receiver 12A through a path shown by a broken line as a reflected pulse.

The processing element 13 computes the path-by-path reception distance of every reflected wave (reception distance shown by each line in FIG. 3), and based on each reception distance, finds points of intersection of an arc 21 with the transmitter-receiver 12A as center and the distance to the object A as radius, an arc 22 with the transmitter-receiver 12B as center and the distance to the object A as radius and an elliptic curve 23 passing through the object A with the two transmitter-receivers 12A and 12B as center (or a trail of points at which the sum of the distance from the transmitter-receiver 12A and that from the transmitter-receiver 12B (the reception distances shown by the dash-dot line and the broken line) is constant).

In the processing element 13, when the points of intersection of the arcs 21 and 22 and the elliptic curve 23 can be approximated roughly to one point as shown in FIG. 3, it is determined that the object A is single and small. Furthermore, by analyzing the change with time of the reception strength of every reflected pulse and judging whether the reception strength of every received reflected pulse unstably changes with time, whether a human is included in the detected object is determined.

Figure 4:
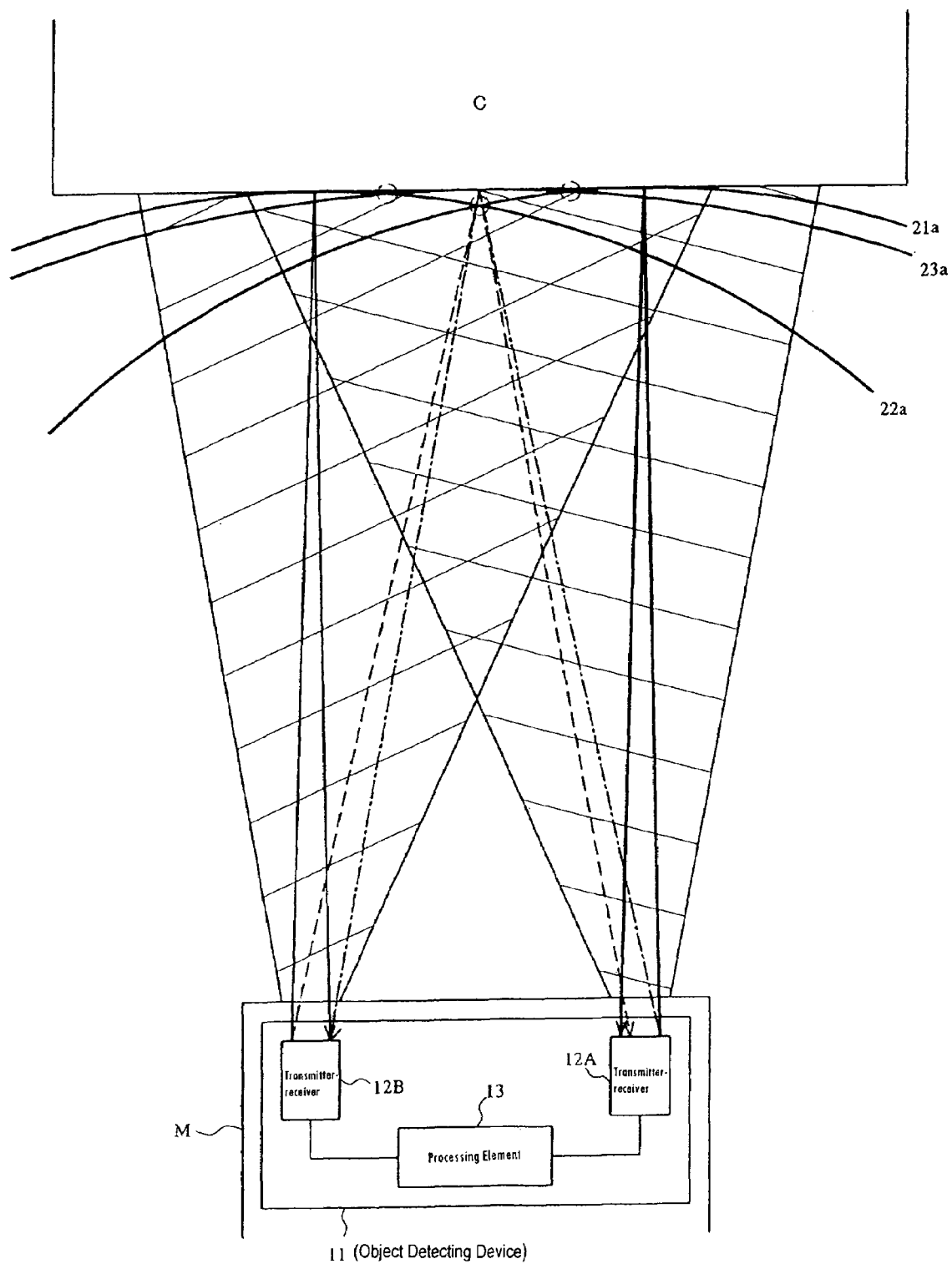
FIG. 4 is an illustration showing a method of object determination in the case of a single large object being present ahead of the vehicle.

FIG. 4 is an illustration showing a method of object determination in the case of a large object C being present ahead of a vehicle M.

When an electromagnetic pulse is transmitted from the transmitter-receiver 12A, the transmitter-receiver 12A receives an electromagnetic wave which struck the object C and returned through a path (the shortest path) shown by a heavy solid line as a reflected pulse, while the transmitter-receiver 12B receives an electromagnetic wave which traveled from the transmitter-receiver 12A, struck the object C and returned through a path (the shortest path) shown by a dash-dot line as a reflected pulse.

On the other hand, when an electromagnetic pulse is transmitted from the transmitter-receiver 12B, the transmitter-receiver 12B receives an electromagnetic wave which struck the object C and returned through a path shown by a solid line as a reflected pulse, while the transmitter-receiver 12A receives an electromagnetic wave which traveled from the transmitter-receiver 12B, struck the object C and returned through a path shown by a broken line as a reflected pulse.

The processing element 13 computes the path-by-path reception distance of every reflected wave (reception distance shown by each line in FIG. 4), and based on each reception distance, finds points of intersection of an arc 21$a$ with the transmitter-receiver 12A as center and the distance to the object C as radius, an arc 22$a$ with the transmitter-receiver 12B as center and the distance to the object C as radius and an elliptic curve 23$a$ passing through the object C with the two transmitter-receivers 12A and 12B as center (or a trail of points at which the sum of the distance from the transmitter-receiver 12A and that from the transmitter-receiver 12B (the reception distances shown by the dash-dot line and the broken line) is constant).

In the processing element 13, when the points of intersection of the arcs 21$a$ and 22$a$ and the elliptic curve 23$a$ cannot be approximated roughly to one point (in this case, three points of intersection are formed) and there is only one elliptic curve 23$a$ as shown in FIG. 4, it is determined that the detected object C is single and large.

Figure 5:
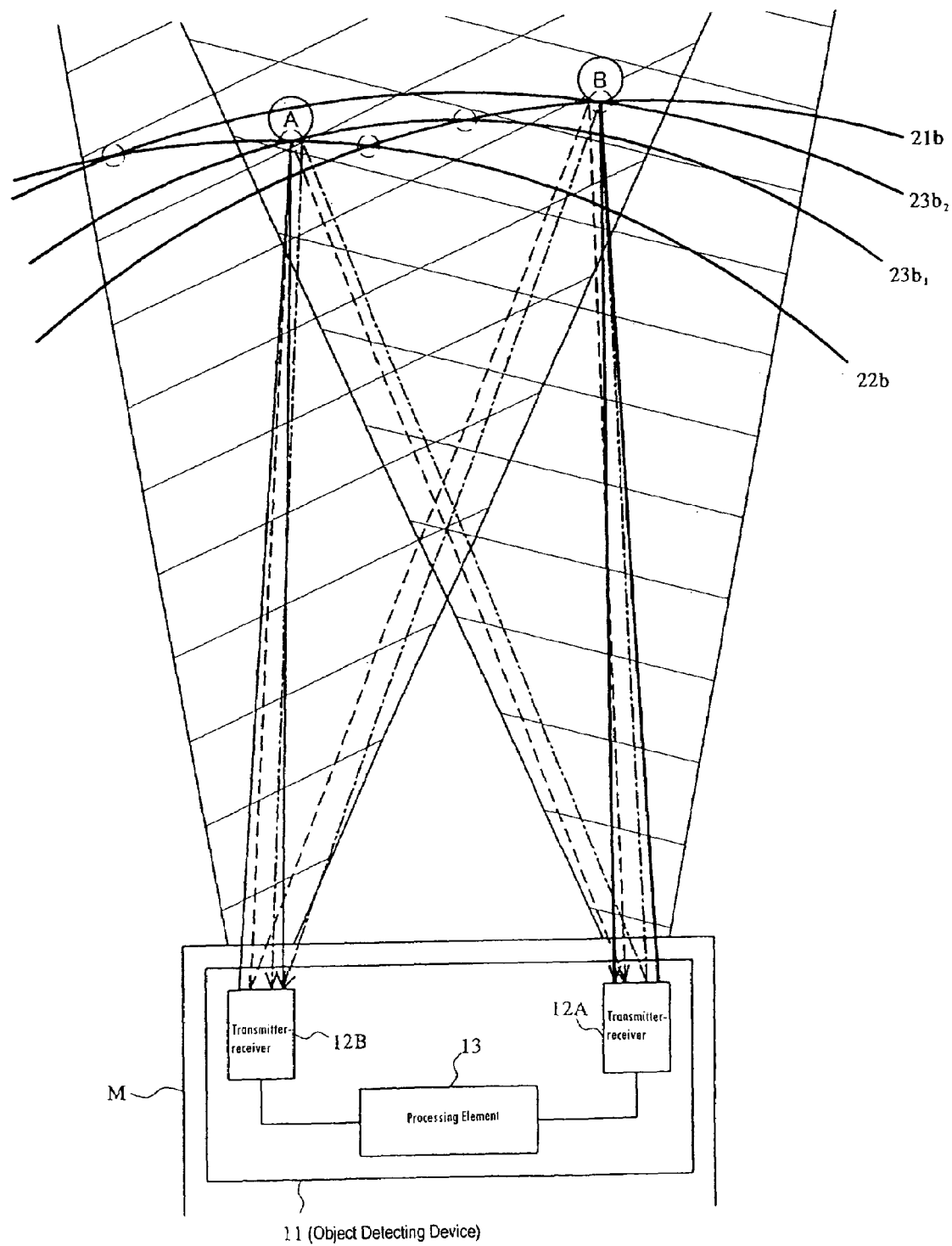
FIG. 5 is an illustration showing a method of object determination in the case of multiple small objects being present ahead of the vehicle.

FIG. 5 is an illustration showing a method of object determination in the case of small objects A and B being present ahead of a vehicle M. Here, the objects A and B are present in an area (a crossing area of oblique lines) where an object can be detected by both the transmitter-receivers 12A and 12B.

When an electromagnetic pulse is transmitted from the transmitter-receiver 12A, the transmitter-receiver 12A receives an electromagnetic wave which struck the nearest object B thereto and returned (a path shown by a heavy solid line) as a reflected pulse, while the transmitter-receiver 12B receives an electromagnetic wave which returned through a path connecting the transmitter-receiver 12A, the object A and the transmitter-receiver 12B and an electromagnetic wave which returned through a path connecting the transmitter-receiver 12A, the object B and the transmitter-receiver 12B, shown by dash-dot lines, as reflected pulses.

On the other hand, when an electromagnetic pulse is transmitted from the transmitter-receiver 12B, the transmitter-receiver 12B receives an electromagnetic wave which struck the nearest object A thereto and returned (a path shown by a solid line) as a reflected pulse, while the transmitter-receiver 12A receives an electromagnetic wave which returned through a path connecting the transmitter-receiver 12B, the object A and the transmitter-receiver 12A and an electromagnetic wave which returned through a path connecting the transmitter-receiver 12B, the object B and the transmitter-receiver 12A, shown by broken lines, as reflected pulses.

The processing element 13 computes the path-by-path reception distance of every reflected wave (reception distance shown by each line in FIG. 5), and based on each reception distance, finds points of intersection of an arc 21b with the transmitter-receiver 12A as center and the distance to the object B as radius, an arc 22b with the transmitter-receiver 12B as center and the distance to the object A as radius, an elliptic curve $23b_1$ passing through the object A with the two transmitter-receivers 12A and 12B as center and an elliptic curve $23b_2$ passing through the object B with the two transmitter-receivers 12A and 12B as center.

In the processing element 13, when the points of intersection of the arcs 21b and 22b and the elliptic curves $23b_1$ and $23b_2$ cannot be approximate roughly to one point and the elliptic curves $23b_1$ and $23b_2$ are not the same as shown in FIG. 5, it is determined that the detected objects A and B are multiple and small. Furthermore, by analyzing the time-varying status of the reception strength of every reflected pulse and judging whether the reception strength of said every received reflected pulse shows an unstable change with time, whether a human is included in the detected object is determined.

Figure 6:
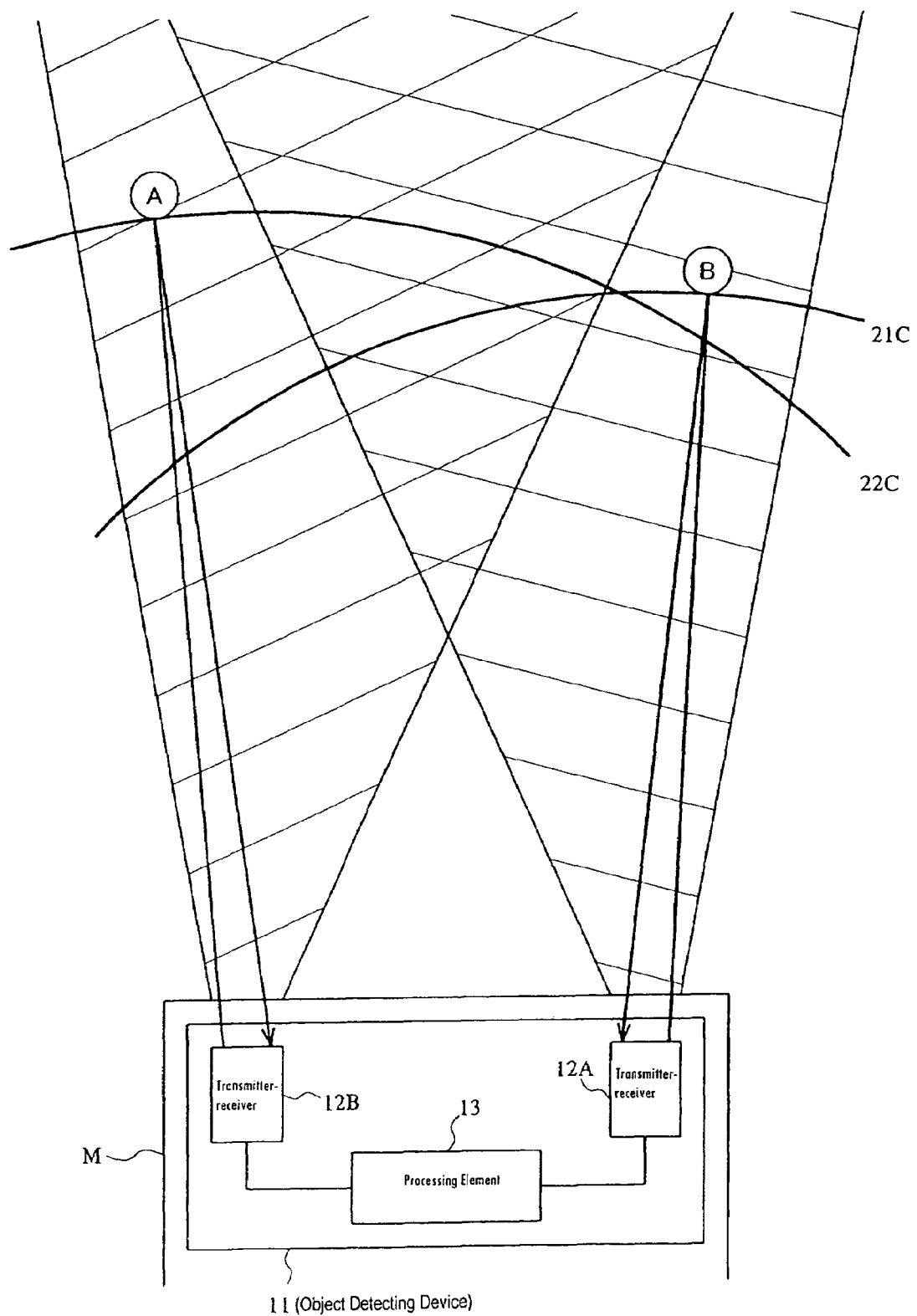
FIG. 6 is an illustration showing another method of object determination in the case of multiple small objects being present ahead of the vehicle.

FIG. 6 is an illustration showing another method of object determination in the case of small objects A and B being present ahead of a vehicle M. Here, the objects A and B are present in areas (diagonally shaded areas) where an object is detected only by either the transmitter-receiver 12A or 12B, respectively.

When an electromagnetic pulse is transmitted from the transmitter-receiver 12A, the transmitter-receiver 12A receives an electromagnetic wave which struck the nearest object B thereto within the transmission-reception area of radio waves thereof and returned (transferred through a path shown by a heavy solid line) as a reflected pulse. On the other hand, the transmitter-receiver 12B cannot receive a reflected pulse from the object B since the object B is not present within the transmission-reception area of radio waves thereof.

And when an electromagnetic pulse is transmitted from the transmitter-receiver 12B, the transmitter-receiver 12B receives an electromagnetic wave which struck the nearest object A thereto within the transmission-reception area of radio waves thereof and returned (transferred through a path shown by a solid line) as a reflected pulse. On the other hand, the transmitter-receiver 12A cannot receive a reflected pulse from the object A since the object A is not present within the transmission-reception area of radio waves thereof.

The processing element 13 computes the path-by-path reception distance of every reflected wave (reception distance shown by each line in FIG. 6). When it is judged that both the reception distances (the heavy solid line and the solid line) of reflected pulses of electromagnetic waves transmitted by itself are computed and that the reception distances of reflected pulses of electromagnetic waves transmitted by the other transmitter-receiver are not computed, it is determined that the detected objects are multiple and that these detected objects are present in areas where an object is detected only by either the transmitter-receiver 12A or 12B (such as areas set on both sides ahead of a vehicle).

Figure 7A:
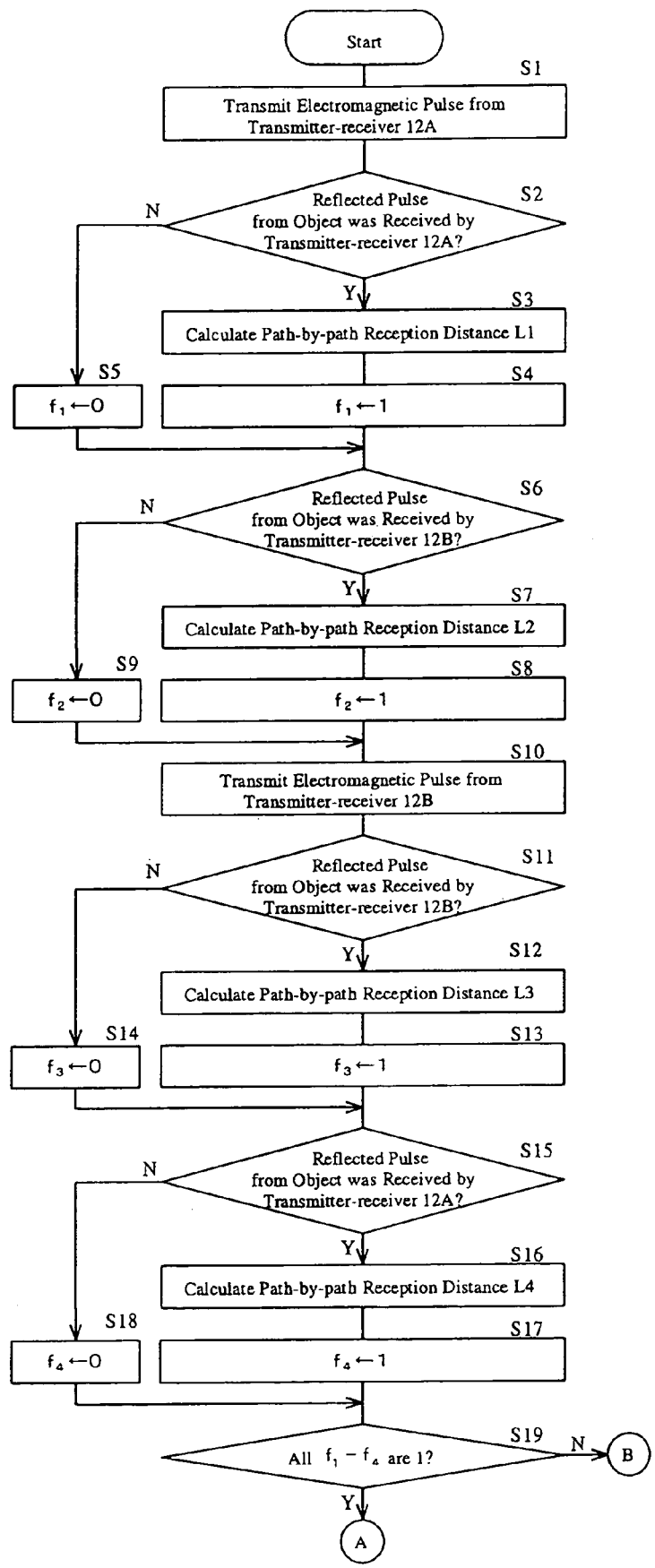
FIG. 7A is a flow chart showing the object determination processing operation performed by a processing element in the object detecting device according to the embodiment.

The processing operation performed by the processing element 13 in the object detecting device 11 according to the embodiment is described below by reference to flow charts shown in FIGS. 7A–7C.

First, in Step 1, processing for allowing the transmitter-receiver 12A to transmit an electromagnetic pulse is conducted, and the operation goes to Step 2. In Step 2, whether a reflected pulse (or a reflected pulse from an object) at a reception level higher than a prescribed value was received by the transmitter-receiver 12A is judged. When it is judged that a reflected pulse from an object was received, the operation goes to Step 3. In Step 3, processing for finding the path-by-path reception distance L1 based on a reflected pulse of a radio wave transmitted by itself (the transmitter-receiver 12A) is conducted based on the delay time detected by the transmitter-receiver 12A, and the operation goes to Step 4. In Step 4, a flag $f_1$ indicating that the path-by-path reception distance L1 was calculated is turned to 1, and then, the operation goes to Step 6.

On the other hand, when it is judged that no reflected pulse from an object has been received in Step 2, the operation goes to Step 5. In Step 5, the flag $f_1$ is turned to 0 (or indicates that the path-by-path reception distance L1 has not been calculated), and the operation goes to step 6.

In Step 6, whether a reflected pulse (or a reflected pulse from an object) at a reception level higher than a prescribed value was received by the transmitter-receiver 12B is judged. When it is judged that a reflected pulse from an object was received, the operation goes to Step 7. In Step 7, processing for finding the path-by-path reception distance L2 of a reflected pulse of a radio wave transmitted by the transmitter-receiver 12A is conducted based on the delay time detected by the transmitter-receiver 12B, and the operation goes to Step 8. In Step 8, a flag $f_2$ indicating that the path-by-path reception distance L2 was calculated is turned to 1, and then, the operation goes to Step 10.

On the other hand, when it is judged that no reflected pulse from an object has been received in Step 6, the operation goes to Step 9. In Step 9, the flag $f_2$ is turned to 0 (or indicates that the path-by-path reception distance L2 has not been calculated), and the operation goes to step 10.

In Step 10, processing for allowing the other transmitter-receiver 12B to transmit an electromagnetic pulse is conducted after an elapse of a prescribed radio wave reception time, and the operation goes to Step 11. In Step 11, whether a reflected pulse (or a reflected pulse from an object) at a reception level higher than a prescribed value was received by the transmitter-receiver 12B is judged. When it is judged that a reflected pulse from an object was received, the operation goes to Step 12. In Step 12, processing for finding the path-by-path reception distance L3 based on a reflected pulse of a radio wave transmitted by itself (the transmitter-receiver 12B) is conducted based on the delay time detected by the transmitter-receiver 12B, and the operation goes to Step 13. In Step 13, a flag $f_3$ indicating that the path-by-path reception distance L3 was calculated is turned to 1, and then, the operation goes to Step 15.

On the other hand, when it is judged that no reflected pulse from an object has been received in Step 11, the operation goes to Step 14. In Step 14, the flag $f_3$ is turned to 0 (or indicates that the path-by-path reception distance L3 has not been calculated), and the operation goes to step 15.

In Step 15, whether a reflected pulse (or a reflected pulse from an object) at a reception level higher than a prescribed value was received by the transmitter-receiver 12A is judged. When it is judged that a reflected pulse from an object was received, the operation goes to Step 16. In Step 16, processing for finding the path-by-path reception distance L4 of a reflected pulse of a radio wave transmitted by the transmitter-receiver 12B is conducted based on the delay time detected by the transmitter-receiver 12A, and the operation goes to Step 17. In Step 17, a flag $f_4$ indicating that the path-by-path reception distance L4 was calculated is turned to 1, and then, the operation goes to Step 19.

On the other hand, when it is judged that no reflected pulse from an object has been received in Step 15, the operation goes to Step 18. In Step 18, the flag $f_4$ is turned to 0 (or indicates that the path-by-path reception distance L4 has not been calculated), and the operation goes to step 19.

In Step 19, whether all of the flags $f_1$–$f_4$ are 1 or not is judged. When it is judged that all of the flags $f_1$–$f_4$ are 1 (or that all of the path-by-path reception distances L1–L4 have been calculated), the operation goes to Step 20.

Figure 7B:
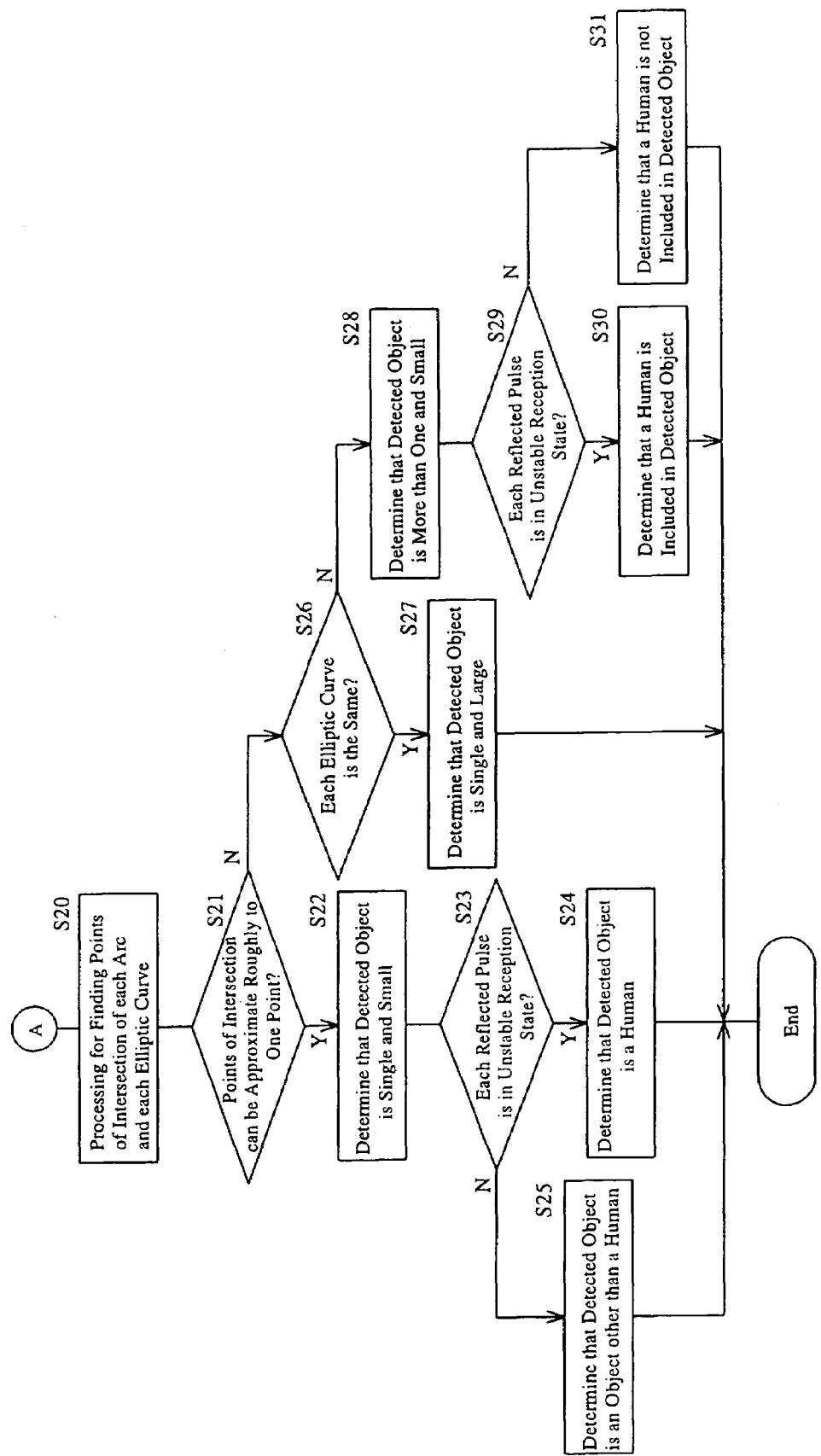
FIG. 7B is a flow chart showing the object determination processing operation performed by the processing element in the object detecting device according to the embodiment.
Figure 7C:
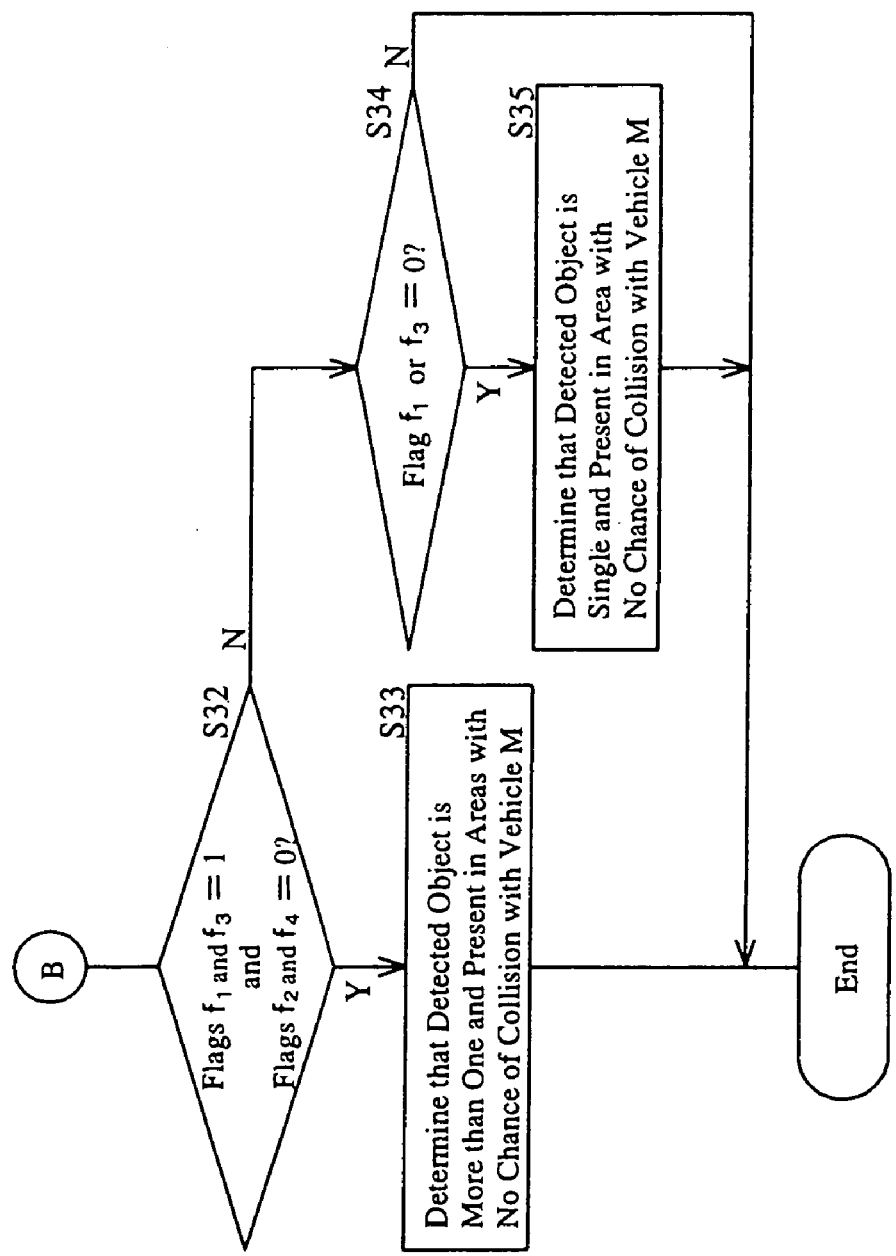
FIG. 7C is a flow chart showing the object determination processing operation performed by the processing element in the object detecting device according to the embodiment.
Figure 8A:
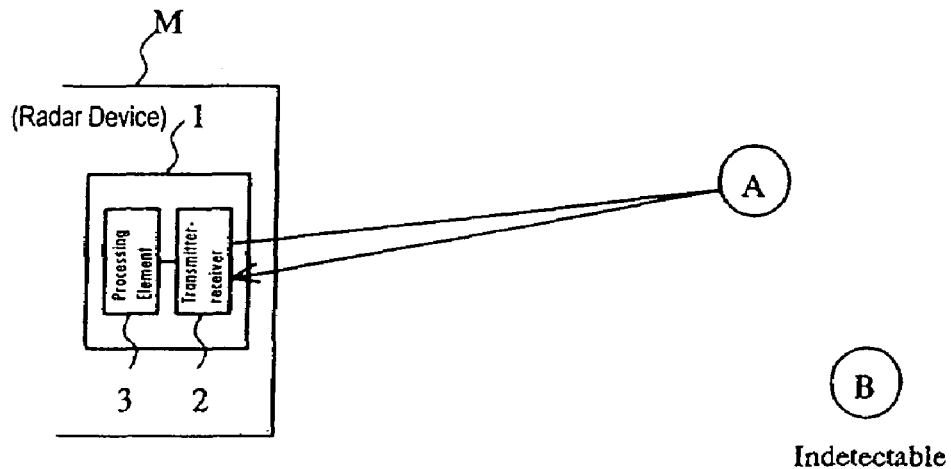
Figure 8B:
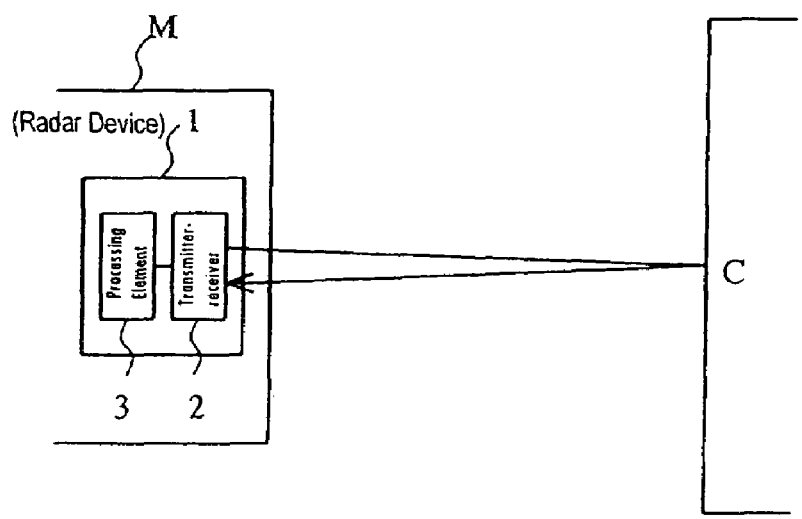
Figure 9A:
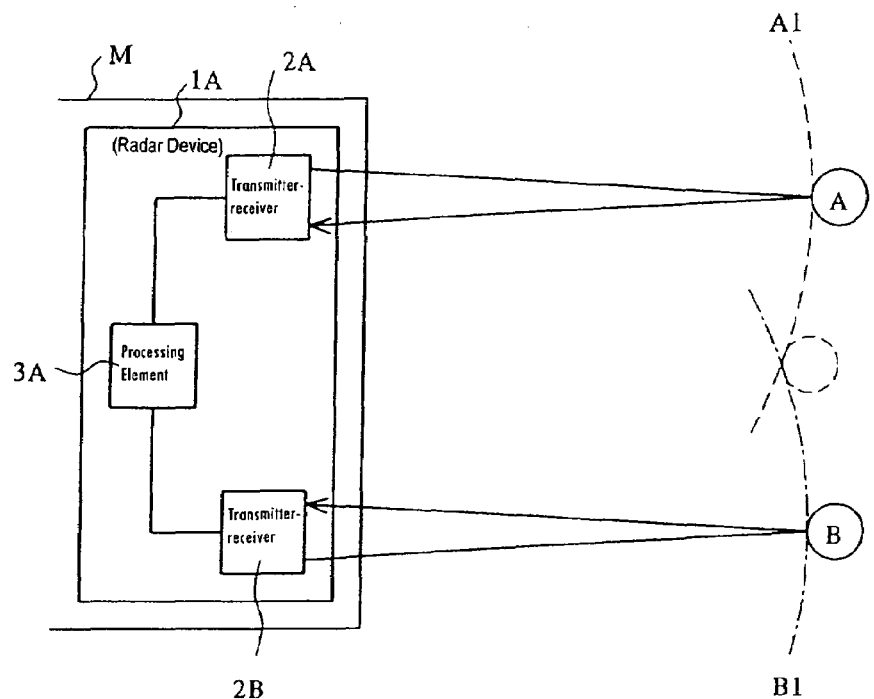
Figure 9B:
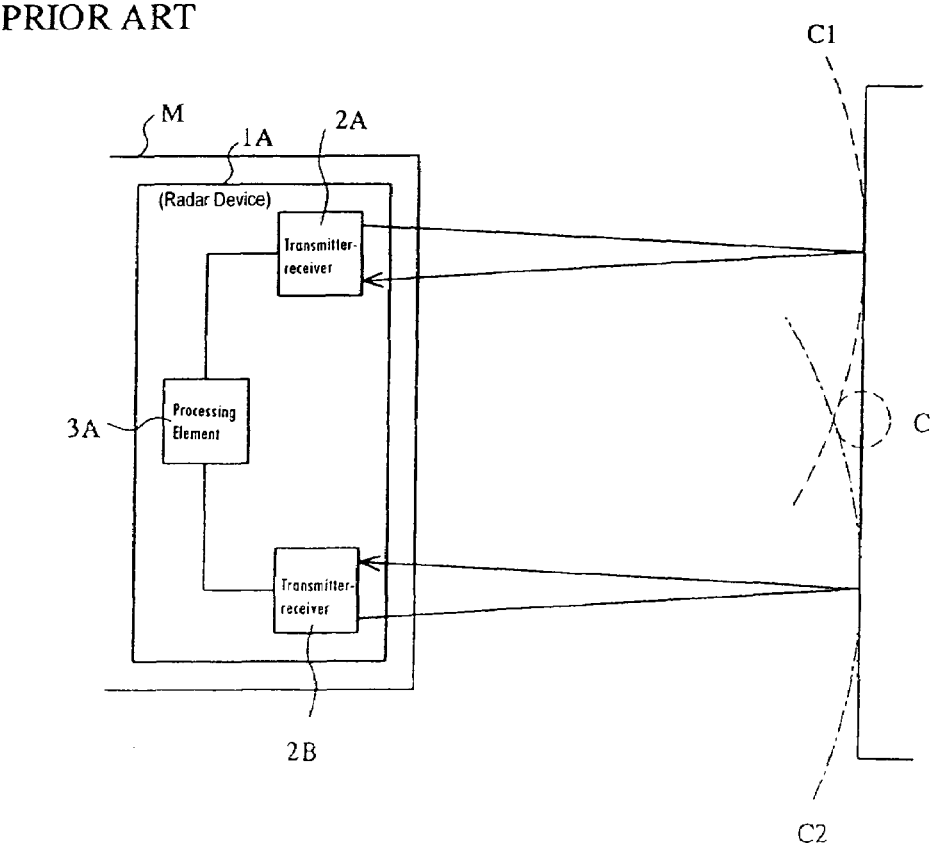

In Step 20 shown in FIG. 7B, processing for finding points of intersection of each arc with the transmitter-receiver 12A or 12B, respectively, as center and the distance to a detected object (or a half of the path-by-path reception distance L1 or L3) as radius and each elliptic curve (each trail of points at which the path-by-path reception distance L2 or L4 is constant) passing through each detected object with the two transmitter-receivers 12A and 12B as center is conducted, and then, the operation goes to Step 21.

In Step 21, whether the points of intersection of each arc and each elliptic curve can be approximated roughly to one point (or whether all of the points of intersection are formed within a prescribed range where they can be approximated roughly to one point) is judged. When it is judged that the points of intersection thereof can be approximated roughly to one point as shown in FIG. 3, the operation goes to Step 22.

In Step 22, it is determined that the detected object is single and small, and the operation goes to Step 23. In Step 23, whether the change with time of the reception strength of every received reflected pulse is unstable (or whether the change has regularity such as a Rayleigh distribution or a rice distribution and the reception state is unstable) is judged. When it is judged that the change with time of the reception strength of every reflected pulse is unstable, the operation goes to Step 24, wherein it is determined that the detected object is a human and a determination signal indicating that the detected object is single and a human is output to a prescribed control device, which is the end of the processing.

On the other hand, when it is judged that the relationship between the points of intersection of each arc and each elliptic curve is not such that they may be approximated roughly to one point (or they cannot be approximated roughly to one point), the operation goes to Step 26.

On the other hand, when it is judged that the relationship between the points of intersection of each arc and each elliptic curve is not such that they may be approximate roughly to one point (or they cannot be approximate roughly to one point), the operation goes to Step 26.

In Step 26, whether each elliptic curve is the same or not is judged. When it is judged that each elliptic curve is the same as shown in FIG. 4, the operation goes to Step 27, wherein it is determined that the detected object is single and large and the determination signal is output to a prescribed control device, which is the end of the processing.

On the other hand, when it is judged that the elliptic curves are not the same as shown in FIG. 5 in Step 26, the operation goes to Step 28, wherein it is determined that the detected object is more than one and small, and goes to Step 29.

In Step 29, whether the change with time of the reception strength of every received reflected pulse is unstable (or whether the reception state of every reflected pulse is unstable) is judged. When it is judged that the change with time of the reception strength of every reflected pulse is unstable, the operation goes to Step 30, wherein it is determined that a human is included in the detected object and a determination signal indicating that the detected object is more than one and small, including a human, is output to a prescribed control device, which is the end of the processing.

On the other hand, when it is judged that the change with time of the reception strength of every reflected pulse is not unstable (or the reception state is stable) in Step 29, the operation goes to Step 31, wherein it is determined that no human is included in the detected object and a determination signal indicating that the detected object is more than one and small, including no human, is output to a prescribed control device, which is the end of the processing.

On the other hand, when it is judged that all of the flags $f_1$–$f_4$ are not 1 (or that at least one of the path-by-path reception distances L1–L4 has not been calculated) in Step 19, the operation goes to Step 32. In Step 32 shown in FIG. 7C, whether the flags $f_1$ and $f_3$ are 1 and the flags $f_2$ and $f_4$ are 0 is judged. When it is judged that the flags $f_1$ and $f_3$ are 1 and that the flags $f_2$ and $f_4$ are 0, the operation goes to Step 33.

In Step 33, it is determined that the detected object is more than one and that each of the detected objects is present in an area where it is detected only by either the transmitter-receiver 12A or 12B (or present in an area where it does not come into collision with the vehicle M) as shown in FIG. 6, and the determination signal is output to a prescribed device, which is the end of the processing.

On the other hand, when it is judged that the flags $f_1$ and $f_3$ are 1 and the flags $f_2$ and $f_4$ are not 0 in Step 32, the operation goes to Step 34. In Step 34, whether the flag $f_1$ or $f_3$ is 0 or not is judged. When it is judged that the flag $f_1$ or $f_3$ is 0, the operation goes to Step 35. In Step 35, it is determined that the detected object is single and is present in an area where it is detected only by either the transmitter-receiver 12A or 12B (or present in an area where it does not come into collision with the vehicle M), and the determination signal is output to a prescribed device, which is the end of the processing. On the other hand, when it is judged that the flag $f_1$ or $f_3$ is not 0 (or that the flags $f_1$ and $f_3$ are 0) in Step 35, it is judged that no object has been detected and the processing is ended.

Using the object detecting device 11 according to the embodiment, the reflected wave of the radio wave transmitted by itself and the reflected wave of the radio wave transmitted by the other transmitter-receiver are received by each of the transmitter-receivers 12A and 12B, and the path-by-path reception distance of every reflected wave is computed. Based on the relationship between the computed reception distances, the number and/or size of the detected objects can be determined. Therefore, based on the determined number and/or size of the detected objects, control for avoiding a collision with the detected object before it happens, control for protecting occupants and the like in a collision or the like can be conducted with attention to every detail. It becomes possible to conduct appropriate control according to the number and size of the detected objects and a mechanism for sweepingly transmitting radio waves or the like is not required. As a result, the construction of the device is not made more complex and the cost of components can be held down.

When it is determined that the detected object is small, appropriate control according to the type of the detected object (such as a human) is highly needed to be conducted. Using the object detecting device 11, since the type of the detected object, or whether a human is included or not is determined by the type determination element 13d, type determination can be appropriately conducted when the necessity for the type determination is high, so that the determination processing of objects can be effectively conducted. When the detected object is a human, control with attention to every detail such as control for protecting the man can be conducted.

Moreover, it becomes possible to appropriately determine the case where the detected objects are multiple and are present in areas where an object is detected only by either the transmitter-receiver 12A or 12B (for example, the case where objects are present ahead of a vehicle but present on both sides where there is a low risk of a collision even if the vehicle goes straight forward) and it is possible to judge a direction for avoiding a collision with the detected object and the like.

Here, the case of two transmitter-receivers being mounted on the object detecting device is described in this embodiment, but in the case of three or more transmitter-receivers being mounted thereon, it is possible to determine the number and/or size of detected objects by conducting similar processing.

INDUSTRIAL APPLICABILITY

The object detecting device according to the present invention can be applied to a preventive safety system for avoiding a collision with an obstacle such as a vehicle or a pedestrian, a passenger protection system for protecting occupants in a collision with an obstacle and the like, and by appropriately determining the number and/or size of detected objects, these systems can be controlled with attention to every detail, resulting in an enhanced precision of system operation.

What is claimed is:

1. An object detecting device, comprising:
    a plurality of transmitter-receivers for transmitting radio waves and receiving reflected waves, wherein each of the transmitter-receivers receives both a reflected wave of a radio wave transmitted by itself and reflected waves of radio waves transmitted by other transmitter-receivers;
    a path-by-path reception distance computing unit for computing the path-by-path reception distance of every reflected wave; and
    an object determination element for determining at least one of a number and a size of detected objects based on a relationship between the reception distances computed by the path-by-path reception distance computing unit.

2. An object detecting device according to claim 1, wherein:
    the object determination element determines that there is only one detected object which has a small size when points of intersection of each arc with each transmitter-receiver as a center and a distance to the detected object as a radius, and each elliptic curve passing through the detected object with two of the transmitter-receivers as the center are approximated roughly to one point.

3. An object detecting device according to claim 1, wherein:
    the object determination element determines that there is more than one detected object which have a small size when points of intersection of each arc with each transmitter-receiver as a center and a distance to a respective one of the detected objects as a radius, and each elliptic curve passing through a respective one of the detected objects with two of the transmitter-receivers as the center are not approximated roughly to one point and each of the elliptic curves are not the same.

4. An object detecting device according to claim 1, wherein:
    the object determination element determines that there is only one detected object and has a large when points of intersection of each arc with each transmitter-receiver as a center and a distance to the detected object as a radius, and each elliptic curve passing through the detected object with two of the transmitter-receivers as the center are not approximated roughly to one point and each elliptic curve is the same.

5. An object detecting device according to claim 1, comprising:
    a type determination element for determining a type of the detected object based on a time-varying characteristic of a reception strength of every reflected wave.

6. An object detecting device according to claim 5, wherein:
    the type determination element determines the type of the detected object when it is determined that the detected object has a small size by the object determination element.

7. An object detecting device according to claim 6, wherein:
    the type determination element determines that a human is included in the detected object when the reception strength of every reflected wave changes unstably with time.

8. An object detecting device according to claim 1, wherein:
    the object determination element determines that there is more than one detected object and that the detected objects are each located in areas to be detected by only one of the transmitter-receivers when a reception distance of a reflected wave received by each transmitter-receiver of a radio wave transmitted by itself is computed and the reception distances of reflected waves of radio waves transmitted by other transmitter-receivers are not computed.

* * * * *